(12) United States Patent
Bozeman et al.

(10) Patent No.: US 7,584,220 B2
(45) Date of Patent: Sep. 1, 2009

(54) SYSTEM AND METHOD FOR DETERMINING TARGET FAILBACK AND TARGET PRIORITY FOR A DISTRIBUTED FILE SYSTEM

(75) Inventors: Patrick Bozeman, Sammamish, WA (US); Scott Eric Colville, Kirkland, WA (US); Mukul Gupta, Redmond, WA (US); Daniel Edward Lovinger, Seattle, WA (US); Ravisankar V. Pudipeddi, Sammamish, WA (US); Ramesh Shankar, Redmond, WA (US); Supriya Wickrematillake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 11/053,386

(22) Filed: Feb. 7, 2005

(65) Prior Publication Data

US 2006/0085428 A1    Apr. 20, 2006

Related U.S. Application Data

(60) Provisional application No. 60/615,411, filed on Oct. 1, 2004.

(51) Int. Cl.
G06F 17/30 (2006.01)
(52) U.S. Cl. ...................... 707/200; 707/205
(58) Field of Classification Search ............. 707/100, 707/205, 200
See application file for complete search history.

(56) References Cited

U.S. PATENT DOCUMENTS

| | | | |
|---|---|---|---|
| 4,825,354 A | 4/1989 | Agrawal et al. | |
| 4,887,204 A | 12/1989 | Johnson et al. | |
| 4,914,571 A | 4/1990 | Baratz et al. | |
| 5,029,199 A | 7/1991 | Jones et al. | |
| 5,095,423 A | 3/1992 | Gramlich et al. | |
| 5,222,242 A | 6/1993 | Choi et al. | |
| 5,341,499 A | 8/1994 | Doragh | |

(Continued)

FOREIGN PATENT DOCUMENTS

WO    WO 98/18076    4/1998

(Continued)

OTHER PUBLICATIONS

EP Search Report for EP 05 10 8705.

(Continued)

*Primary Examiner*—Don Wong
*Assistant Examiner*—Kim T Nguyen
(74) *Attorney, Agent, or Firm*—Merchant & Gould, P.C.

(57) ABSTRACT

A system and method for organizing and sorting targets received in a referral response and for realizing a target failback and a target priority policy in a distributed file system is provided. In one embodiment, a sorting method includes receiving a referral response in the form of a list of targets that are sorted into bounded sets. Having a sorted referral response in bounded sets provides a basis for implementing a target fail-back and a target priority policy. The computer system may select a target from a sorted list of targets sorted according to site-cost and/or target priority. Then, the computer system may determine if the set target is associated with a more preferred target when compared to all available targets in the sorted list and if not, switch back to a more preferred target.

16 Claims, 8 Drawing Sheets

U.S. PATENT DOCUMENTS

| | | | |
|---|---|---|---|
| 5,377,323 A | 12/1994 | Vasudevan | |
| 5,425,028 A | 6/1995 | Britton et al. | |
| 5,434,974 A | 7/1995 | Loucks et al. | |
| 5,493,607 A | 2/1996 | Arumainayagam et al. | |
| 5,617,568 A | 4/1997 | Ault et al. | |
| 5,664,187 A * | 9/1997 | Burkes et al. | 707/205 |
| 5,689,701 A | 11/1997 | Ault et al. | |
| 5,701,462 A | 12/1997 | Whitney et al. | |
| 5,724,512 A | 3/1998 | Winterbottom | |
| 5,842,214 A | 11/1998 | Whitney et al. | |
| 5,909,540 A | 6/1999 | Carter et al. | |
| 5,970,501 A * | 10/1999 | Hunkins et al. | 707/200 |
| 6,006,018 A | 12/1999 | Burnett et al. | |
| 6,031,977 A | 2/2000 | Pettus | |
| 6,081,898 A | 6/2000 | Miller et al. | |
| 6,119,151 A | 9/2000 | Cantrell et al. | |
| 6,185,574 B1 * | 2/2001 | Howard et al. | 707/200 |
| 6,463,454 B1 * | 10/2002 | Lumelsky et al. | 718/105 |
| 6,473,756 B1 | 10/2002 | Ballard | 707/6 |
| 6,519,612 B1 * | 2/2003 | Howard et al. | 707/200 |
| 6,609,128 B1 * | 8/2003 | Underwood | 707/10 |
| 6,731,625 B1 * | 5/2004 | Eastep et al. | 370/352 |
| 6,795,434 B1 | 9/2004 | Kumar et al. | 370/392 |
| 7,065,500 B2 * | 6/2006 | Singh et al. | 705/26 |
| 2002/0019828 A1 * | 2/2002 | Mortl | 707/200 |
| 2002/0112022 A1 * | 8/2002 | Kazar et al. | 709/217 |
| 2002/0169760 A1 * | 11/2002 | Cheung et al. | 707/3 |
| 2003/0110188 A1 * | 6/2003 | Howard et al. | 707/200 |
| 2003/0191781 A1 * | 10/2003 | Civanlar et al. | 707/200 |
| 2003/0212571 A1 * | 11/2003 | Sazawa et al. | 705/1 |
| 2004/0133606 A1 * | 7/2004 | Miloushev et al. | 707/200 |
| 2004/0133607 A1 * | 7/2004 | Miloushev et al. | 707/200 |
| 2007/0106752 A1 * | 5/2007 | Moore | 709/217 |
| 2007/0106754 A1 * | 5/2007 | Moore | 709/217 |

FOREIGN PATENT DOCUMENTS

| | | |
|---|---|---|
| WO | WO 00/77637 | 12/2000 |
| WO | WO 01/93109 | 12/2001 |
| WO | WO 2004/036408 | 4/2004 |

OTHER PUBLICATIONS

Fei, Zongming, et al., "A Novel Server Selection Technique for Improving the Response Time of a Replicated Service," INFOCOM '98, 17th Annual Joint Conference of the IEEE Computer and Communications Societies. Proceedings. IEEE, San Francisco, CA, Mar. 29-Apr. 2, 1998, vol. 2, pp. 783-791.

A. Mena III and C. Burnett., *IBM White Paper: Performance Characteristics of the DCE Distribution File Service*, pp. 1-15. [Retrieved on Jan. 28, 2008] Retrieved from Internet: <URL: http://www-306.ibm.com/software/network/dce/library/whitepapers/dfsperf.html>.

B. Callaghan et al. *NFS Version 3 Protocol Specification*, RFC 1813 (Jun. 1995) Network Working Group pp. 1-118. [Retrieved on Jan. 28, 2008] Retrieved from Internet: <URL: http://www.ietf.org.rfc/rfc1813.txt>.

B. Swingle, FreeBSD Network Handbook; Network File System (NFS) Ch. 27 Network Servers, pp. 1-5. [Retrieved on Jan. 28, 2008] Retrieved from Internet: <URL: http://www.freebsd.org/doc/en_US.ISO8859-1/books/handbook/network-nfs.html>.

C. Davis et al., *A Means for Expressing Location Information in the Domain Name System*, RFC 1876 (Jan. 1996) pp. 1-17. [Retrieved on Jan. 23, 2008] Retrieved from Internet: <URL: http://www.ietf.org.rfc/rfc1876.txt>.

C. Weider et al., *Executive Introduction to Directory Services Using the X.500 Protocol*, RFC 1308 (Mar. 1992), pp. 1-4. [Retrieved on Jan. 28, 2008] Retrieved from Internet: <URL: http://www.ietf.org.rfc/rfc1308.txt Retrieved on Jan. 23, 2008>.

E. Stokes et al., *Lightweight Directory Access Protocol (v3) Replication Requirements*, RFC 3384 (Oct. 2002) pp. 1-29. [Retrieved on Jan. 28, 2008] Retrieved from Internet: <URL: http://www.ietf.org.rfc/rfc3384.txt>.

HP's NFS Service Administrator's Guide; Configuring and Administering AutoFS, 2004 Hewlett-Packard Development Company, LP pp. 1-28. [Retrieved on Jan. 28, 2008] Retrieved from Internet: <URL: http://docs.hp.com/en/5991-1154/ch02s05.html>.

IBM Transarc, Free from Wikipedia: (1989) p. 1. [Retrieved on Jan. 28, 2008] Retrieved from Internet: <URL: http://en.wikipedia.org/wiki/Transarc>.

IBM Transarc, IBM Software from A-Z, Retrieved from Software Announcement [Retrieved on ] Jun. 17, 1997 p. 1-69. Retrieved from Internet: <URL: http://www-01.ibm.com/common/ssi/rep_ca/0/897/ENUS297-220/index.html>.

J. Postel et al., *Domain Requirements*, RFC 0920 (Oct. 1984), pp. 1-14. Network Working Group. [Retrieved on Jan. 28, 2008] Retrieved from Internet: <URL: http://tools.ietf.org/html/rfc920>.

J. Postel, *The Domain Names Plan and Schedule*. RFC 0881 (Nov. 1983) pp. 1-10. [Retrieved on Jan. 28, 2008] Retrieved from Internet: <URL: http://tools.ietf.org/html/rfc881>.

L. Daigle et al., *Domain-Based Application Service Location Using SRV RRs and the Dynamic Delegation Discovery Service (DDDS)*, RFC 3958 (Jan. 2005) pp. 1-32. [Retrieved on Jan. 28, 2008] Retrieved from Internet: <URL: http://tools.ietf.org/html/rfc3958>.

L. Howard, *Approach for Using LDAP as a Network Information Service*, RFC 2307 (Mar. 1998) pp. 1-20. [Retrieved on Jan. 28, 2008] Retrieved from Internet: <URL: http://ietf.org/rfc/rfc2307.txt>.

M. Wahl et al., *Lightweight Directory Access Protocol (v3)*, RFC 2251 (Dec. 1997) pp. 1-47. [Retrieved on Jan. 28, 2008] Retrieved from Internet: <URL: http://www.ietf.org/rfc/rfc2251.txt>.

Novell eDirectory Reviewers Guide (white paper) pp. 1-10. [Retrieved on Jan. 28, 2008] Retrieved from Internet: <URL: http://www.novell.com/collateral/4621312/4621312.html>.

Novell eDirectory White Paper, pp. 1-8. [Retrieved on Jan. 28, 2008] Retrieved from Internet: <URL: http://www.novell.com/products/edirectory/edirectory_wp.html>.

Open AFS Timeline, pp. 1-4. [Retrieved on Jan. 28, 2008] Retrieved from Internet: <URL: http://www.dementia.org/twiki/bin/view/AFSLore/AncientHistory> Last modified: Mar. 2, 2007 <webmaster@openafs.org>.

Open AFS Volume Management, pp. 1-4. [Retrieved on Jan. 28, 2008] Retrieved from Internet: <URL: http://www.openafs.org/pages/doc/AdminGuide/auagd010.htm>.

P. Mockapetris, *Domain Names—Concepts and Facilities*, RFC 0882, pp. 1-32. (Nov. 1983) [Retrieved on Jan. 28, 2008] Retrieved from Internet: <URL: http://www.tools.ietf.org/rfc/rfc882.txt>.

P. Mockapetris, *Domain Names—Concepts and Facilities*, RFC 1034 pp. 1-52. (Nov. 1987) [Retrieved on Jan. 28, 2008] Retrieved from Internet: <URL: http://www.ietf.org/html/rfc1034>.

P. Mockapetris, *Domain Names—Implementation and Specification*, RFC 0883 pp. 1-76. (Nov. 1983) [Retrieved on Jan. 28, 2008] Retrieved from Internet: <URL: http://tools.ietf.org/html/rfc883>.

P. Vixie et al., *Dynamic Updates in the Domain Name System (DNS Update)* RFC 2136 pp. 1-25. (Apr. 1997) [Retrieved on Jan. 28, 2008] Retrieved from Internet: <URL: http://www.ietf.org/rfc/rfc2136.txt>.

P.J. Braam, Carnegie Mellon: Coda Distributed File System, pp. 46-51. (Jun. 1998) [Retrieved on Jan. 28, 2008]Retrieved from Internet: <URL: http://www.coda.cs.cmu.edu/1jpaper/1j.html>.

R. Megginson et al., *Lightweight Directory Access Protocol (LDAP) Client Update Protocol (LCUP)* RFC 3928 pp. 1-25. (Oct. 2004) [Retrieved on Jan. 28, 2008] Retrieved from Internet: <URL: http://www.apps.ietf.org/rfc/rfc3928.html>.

R. Sundaram, v1.6, Dec. 27, 2002, pp. 1-2 *Linux Automount mini "Howto"*, [Retrieved on Jan. 28, 2008] Retrieved from Internet: <URL: http://www.linux.org/docs/1dp/howto/Automount.html>.

R. Droms et al., *Netware/IP Domain Name and Information*, RFC 2242, pp. 1-6. (Nov. 1997) [Retrieved on Jan. 28, 2008] Retrieved from Internet: <URL: http://www.ietf.org/rfc/rfc2242.txt>.

Robert L. Carter and Mark E. Crovella, *Server Selection using Dynamic Path Characterization in Wide-Area Network*, Retrieved from: IEEE Infocom '97 Proceedings vol. 3 (Apr. 7-12, 1997) pp. 1-10.

S. Shepler et al., Standards Tracks, *NFS Version 4 Protocol*, RFC 3010, pp. 212. (Dec. 2000) [Retrieved on Jan. 28, 2008] Retrieved from Internet: <URL: http://www.ietf.org/rfc/rfc3010.txt>.

S.E. Hardcastle-Kille, *X.500 and Domain*. RFC 1279, pp. 1-15. (Nov. 1991) [Retrieved on Jan. 28, 2008] Retrieved from Internet: <URL: http://tools.ietf.org/html/rfc1279>.

Security-Enhanced Linux, Sun NFS within NSA, p. 1. [Retrieved on Jan. 28, 2008] Retrieved from Internet: <URL: http://www.nsa.gov/selinux>.

SGI's IRIX Understanding ONC3/NFS, [Retrieved on Jan. 29, 2008], pp. 1-8. Published Nov. 14, 1994, Retrieved from Internet: <URL: http://techpubs.sgi.com/library/tpl/cgibin/getdoc.cgi?coll=0650&db=bks&srch=&fname=SGI_Admin/ONC3NFS_AG/sgi_html/ch01.html,>.

Sun Autofs/automount: Sun's NFS Administrator's Guide; Configuring and Administering AutoFS, pp. 1-9. [Retrieved on Jan. 28, 2008] Retrieved from Internet: <URL: http://docs.sun.com/app/docs/doc/805-3479/6j3agklvg?a=view>.

Sun Autofs/automount: Sun's NFS Administrator's Guide; Configuring and Administering AutoFS, Jan. 28, 2008, pp. 1-32 (2004) [Retrieved on Jan. 28, 2008]Retrieved from Internet: <URL: http://docs.sun.com/app/docs/doc/8053479/6j3agk1vg?q=automount&a=view>.

Sun Microsystems, Inc. Sun 1984, pp. 1-27. (Mar. 1989) [Retrieved on Jan. 28, 2008] Retrieved from Internet: <URL: http://tools.ietf.org/html/rfc1094>.

Sun Microsystems Documentation, System Administration Guide: Naming and Directory Services (FNS and NIS+) Sun NIS, p. 1 [Retrieved on Jan. 28, 2008] Retrieved from Internet,URL: http://docs.sun.com/app/docs/doc/816-4857/6mblqus31?a=view>.

Technical Resources, Dfs FAQ: (May 2004) pp. 1-4. [Retrieved on Jan. 28, 2008] Retrieved from Internet: <URL: http://www.microsoft.com/windowsserver2003/techinfo/overview/dfsfaq.mspx>.

The Internet Society, Sun Microsystems, *An Agreement Between the Internet Society, the IETF, and Sun Microsystems, Inc. in the matter of NFS V.4 Protocols*, RFC 2339 pp. 1-5. (May 1998) [Retrieved on Jan. 28, 2008] Retrieved from Internet: <URL: http://www.ietf.org/rfc/rfc2339.txt>.

The Lustre File System, p. 13. (2003) [Retrieved on Jan. 28, 2008] Retrieved from Internet: <URL: http://www.lustre.org>.

V. Ryan et al., *Schema for Representing CORBA Object References in an LDAP Directory*, RFC 2714 pp. 1-8. (Oct. 1999) [Retrieved on Jan. 28, 2008] Retrieved from Internet: <URL: http://www.ietf.org/rfc/rfc2714.txt>.

V. Ryan et al., *Schema for Representing Java™ Objects in an LDAP Directory*, RFC 2713 pp. 1-20. (Oct. 1999) [Retrieved on Jan. 28, 2008] Retrieved from Internet: <URL: http://www.ietf.org/rfc/rfc2713.txt>.

Vivek S. Pai, *Locality-Aware Request Distribution in Cluster-Based Network Servers*, ACM Sigplan Notices, vol. 33. No. 2 (Nov. 1998).

Windows IT Library, Distributed File System, pp. 1-4. [Retrieved on Mar. 4, 2007] (Published Jul. 1998) Retrieved from Internet: <URL: http://www.windowslibrary.com/Content/386/15/3.html>.

X/Open Company Ltd, DCE DFS: pp. 1-518. (Sep. 1996) [Retrieved on Jan. 28, 2008] Retrieved from Internet: <URL: http://www.opengroup.org/pubs/catalog/p409.htm>.

Zaw-Sing Su et al., *The Domain Naming Convention for Internet User Applications*, RFC 0819 pp. 1-18. (Aug. 1982) [Retrieved on Jan. 28, 2008] Retrieved from Internet: <URL: http://www.ietf.org/rfc/rfc819.txt>.

Andrew File System (No Document).

Sun NFS Referrals (No Document).

VMS Operating System, Digital Equipment Corporation (No Document).

Search Report for Application No. 200505592-6.

Examination Report for Application No. 200505592-6.

Spector, "Uniting File Systems," UNIX Review, vol. 7, No. 3; pp. 61-70 date unknown.

"Chapter 7. Unified Name Service," (Publication Date Not Available), [20 pages].

"Andrew File System (AFS)," Wikipedia, (Publication Date Not Available), [2 pages].

Baker, Steven, New and Improved: NIS+ (Sun Microsystems Inc.'s Network Information Service+) (New worth) (Cohirnn); UNIX Review, vol. 11, No. 1, pp. 21-27; Jan. 1993.

Baldini, A. et al., "MELOGRANUS: The design of a Large Scale Distributed UNIX File System," International Conference on Computer Communication, Sep. 1992, pp. 63-68.

Birrel, A. et al., "The Echo Distributed File System," Systems Research Center, Sep. 10, 1993, [26 pages].

Cabrera, Luis Felipe, et al., "QuickSilver Distributed Files Services: An Architecture for Horizontal Growth," 2nd IEEE Conference on Computer Workstations, Santa Clara, CA; Mar. 7-10, 1988; pp. 23-37.

Callaghan, B. et al., "NFS Version 3 Protocol Specification," RFC 1813, Jun. 1995, [118 pages].

Chappell, D., "New Distributed services give Windows NT a large boost in large networks," BYTE.com, Cover Story: "NT 5.0 in the Enterprise"; May 1997, [6 pages].

Davies, D.W., et al., "Distributed System Architecture Model," Chapter 2; Lecture Notes in Computer Science: Distributed Systems—Architecture and Implementation; pp. 10-43; 1981.

Guy, Richard G., et al, "Name Transparency in Very Large Scale Distributed File System," Proceedings of IEEE Workshop on Experimental Distributed Systems, pp. 20-25; 1990.

Hewlett Packard, "Advanced Server/9000 Concepts and Planning Guide: HP System Networking," Edition 2, 1997, [240 pages]. See in particular Chapter 2 and Chapter 5, from p. 145-150, "How Directory Replication Works".

Kazar, M. et al.; "DEcorum File System Architectural Overview," Proceedings of the USENIX Summer Conference, Anaheim, California; Jun. 1990, pp. 1-13.

Kistler, James J., and Satyanarayanan, M; "Disconnected Operation in a Coda File System," pp. 213-225; 1991.

Kleiman, S.R., "Vnodes: An Architecture for Multiple File System Types in Sun UNIX," (Publication Date Not Available), [10 pages].

Liskov, B. et al., "Replication in the Harp File System," Operating Systems Review, ACM, New York; vol. 25, No. 5; 1991, pp. 226-238.

Macklem, Rick, "The 4.4BSD NFS Implementation," (Publication Date Not Available), [15 pages].

Orimo, M. et al., "Distributed File Management Techniques Based on an Autonomous Decentralized System Concept," Computer Communications, Elsevier Science Publishers BV, Amsterdam, NL; vol. 16, No. 5; May 1993, pp. 298-304.

Ousterhout, John K. et al, "The Sprite Network Operating System," Computer; vol. 21 (2); Feb. 1, 1988; pp. 23-36.

Page, Thomas W., Jr., et al; "Management of Replicated Volume Location Data in the Focus Replicated File System," USENIX Conference Proceedings, pp. 17-29; Summer 1991.

Reiser, Hans, "The Naming System Venture," (Publication Date Not Available), [30 pages].

Robinson, D.C., and Sloman, M.S., Domains; A New Approach to Distributed System Management; IEEE; pp. 154-163; 1988.

Satyanarayanan, M; "Distributed File System," Chapter 9; Distributed Systems; pp. 149-188; 1989.

Satyanarayanan, Mahadev, "Coda: A Highly Available System for a Distributed Workstation Environment," IEEE; pp. 447-459; Apr. 1990.

Satyanarayanan, Mahadev, "Scalable, Secure, and Highly Available Distributed File Access," Computer, pp. 9-20; May 1990.

Schlichting, R. et al., "Mechanisms to Enhance File Availability in Distributed Systems," International Symposium on Fault Tolerant Computing Systems. (Ftcs), Vienna; Jul. 1-4, 1986, pp. 44-49.

Sidebotham, Bob, "Volumes—The Andrew File System Data Structuring Primitives," Proceedings of EUGG Autumn '86; pp. 473-480; Sep. 1986.

Spector, Alfred Z.; "Thoughts on Large Distributed Filed Systems," Proceedings of the German National Computer Conference; pp. 1-10; Oct. 1986.

Sun Microsystems Inc., "NFS: Network File System Protocol Specification," RFC 1094, Mar. 1989, [26 pages].

Thekkath, Chandramohan A.; Mann, Timothy; Lee, Edward K.; "Frangipani: A Scalable Distributed File System," Systems Research Center, (Publication Date Not Available), [14 pages].

Walker, B. et al., "The LOCUS Distributed Operating System," Proceedings of the 9th ACM Symposium on Operating Systems; vol. 17, No. 5; Oct. 10-13, 1983, pp. 49-70.

Wedde, et al., "Distributed Management of Replicated and Partitioned Files Under Dragon Slayer," The Fourteenth Annual International Computer Software & applications Conference, Chicago, Illinois; Oct. 31-Nov. 2, 1990; pp. 436-441.

Welch, Brent Ballinger, "Naming, State Management, and User-Level Extensions in the Sprite Distributed File System," 1990, [2 pages].

Welch, Brent, Ousterhout, John; "Prefix Tables: A Simple Mechanism for Locating Files in a Distributed System," The 6th International Conference on Distributed Computing Systems, Cambridge, Massachusetts; May 19-23; 1986; pp. 184-189.

Yeo et al., "A Taxonomy of issues in Name Systems Design and Implementation," Operating Systems Review; vol. 27(3), Jul. 1993, pp. 4-18.

* cited by examiner

SYSTEM AND METHOD FOR DETERMINING TARGET FAILBACK AND TARGET PRIORITY FOR A DISTRIBUTED FILE SYSTEM

CROSS-REFERENCE TO RELATED APPLICATIONS

The present invention claims priority to U.S. provisional patent application Ser. No. 60/615,411 filed Oct. 1, 2004, and incorporated herein in its entirety.

FIELD OF THE INVENTION

The invention relates generally to computer systems, and more particularly to an improved system and method for determining target fail-back and target priority for a distributed file system.

BACKGROUND OF THE INVENTION

A Distributed File System (Dfs) is a network server component that locates and manages data on a network. Dfs may be used for uniting files on different computers into a single name space, thus, allowing a user to build a single, hierarchical view of multiple file servers and file server shares on a network. In the context of a server computer or set of server computers, Dfs can be likened to a file system for hard disks in a personal computer system. For instance, similar to the role of file systems for providing a uniform named access to collections of sectors on disks, Dfs may provide a uniform naming convention and mapping for collections of servers, shares, and files. Thus, Dfs may organize file servers and their shares into a logical hierarchy which enables a large enterprise to manage and use its information resources more efficiently.

Furthermore, Dfs is not limited to a single file protocol and can support the mapping of servers, shares, and files, regardless of the file client being used, provided that the client supports the native server and share. Dfs may also provide name transparency to disparate server volumes and shares. Through Dfs, an administrator can build a single hierarchical file system whose contents are distributed throughout an organization's wide area network (WAN).

In the past, with the Universal Naming Convention (UNC), a user or application was required to specify the physical server and share in order to access file information. For example, a user or application had to specify \\Server\Share\Path\Filename. Even though UNCs can be used directly, a UNC is typically mapped to a drive letter, such as x:, which, in turn, may be mapped to \\Server\Share. From that point, a user was required to navigate beyond the redirected drive mapping to the data he or she wishes to access. For example, copy x:\Path\More_path\. . . \Filename was required by the user to navigate to a particular file.

As networks grow in size and as enterprises begin to use existing storage—both internally and externally—for purposes such as intranets, the mapping of a single drive letter to individual shares scales rather poorly. Further, although users can use UNC names directly, these users can be overwhelmed by the number of places where data may be stored.

Dfs solves these problems by permitting the linking of servers and shares into a simpler and more easily navigable name space. A Dfs volume permits shares to be hierarchically connected to other shares. Since Dfs maps the physical storage into a logical representation, the net benefit is that the physical location of any number of files becomes transparent to users and applications.

Furthermore, as a network size grows to the level of a global network, several copies of the same file or files may be located in several different locations within the network to help reduce the costs (in terms of network time, network load, etc.) associated with retrieving a file from the network. For example, users of a large network located near a first server location will typically use a copy of a file on a server nearest to them (i.e., users in Seattle may be closest to a server named Redmond that is located near Seattle). Similarly, users of a large network located near a second server location will typically use a copy of a file on a different server nearest to them (i.e., users in Thailand may be closest to a server named Bangkok located in Bangkok). Thus, the site-cost (i.e., a scalar number which is an pseudo-arbitrary indication of a number of network parameters including the distance between client and server, the degrees of server separation, and other physical network parameters) of retrieving a file may be minimized by accessing the nearest server having the requested file or files.

When a user wishes to retrieve a file from a Dfs, the client computer from which the user is requesting the file determines how to go about retrieving the requested file. A client computer may issue a referral request to obtain one or more locations for the requested file or files. A referral may be a relative path between the requesting client computer and a server computer in which the requested file or files may be found. A client computer may request the files or files known to be unavailable locally and a determination may be made as to how many different locations may provide a copy of the requested file. Typically, there may be hundreds or even thousands of targets (i.e., the relative path to the file) indicating locations that may provide the requested file. As such, a referral response, which is returned to the client computers in response to the referral request, typically includes a list of targets corresponding to servers and/or shares having the requested file.

In the past, however, the referral response returned to the client computer may have the targets identified listed in a random order or, in some cases, by site-cost. Each target in the referral response did not necessarily bear any relationship to a target that immediately preceded it or immediately followed it. As a result, the client computer may have simply started at the top of the randomly-ordered list of targets and attempt to establish a connection with each successive target on the list until one responded with connectivity.

A problem with this randomness, however, is the fact that the first available target may, in fact, be literally located on the other side of the world. Thus, the site-cost of communicating with this first-available target may be rather high and undesirable in the long-term.

However, preserving continuity of a connection to a target is somewhat important. This is known as "sticking" or "stickiness." Thus, once the first-available target is located that is able to fulfill the file request of the client computer, typically, all future referrals and requests are also routed to that target unless the user of the client computer specifically requests a new referral. Therefore, the possibly high site-cost connection to the first-available target may remain indefinitely causing all the more network traffic and general overall network cost.

The problem of maintaining inefficient referrals between a client computer and a server computer to preserve continuity may result in high site-cost communication sessions. What is needed is a way for preserving continuity of referral connections while reducing site-cost for the referral connection.

SUMMARY OF THE INVENTION

Briefly, the present invention provides a system and method for organizing and sorting targets received in a referral response and for determining a target fail-back and a target priority for fail-back in a distributed file system. In one embodiment, a sorting method may include requesting, from a client computer, a plurality of locations (i.e., targets) of files, directories, shares, etc.located on one or more computers in a network of computers. Then, a computer, such as a Dfs server, may return a list of targets to the client computer where the list of targets includes a plurality of referrals that each correspond to the requested file or directory location in the network of computers. Furthermore, the list of targets may be sorted based on an assessment of a site-cost associated with each respective target.

Advantageously, lower-cost targets identified by the server computer may be sorted to the top of the referral response. The client computer may simply parse logically through the referral response starting with the lower-cost targets to attempted connectivity before making an attempt to establish connectivity with higher-cost targets.

Such a sorting system may also be implemented including using a priority ranking of targets. Higher priority targets may also be sorted to the top of the referral response. Furthermore, the referral response may be further sorted to include provisions for both site-cost and target-priority. Thus, groups of targets having an equivalent associated site-cost may be further sorted within the group according to an each target's respective associated target-priority.

In another embodiment of the invention, a target fail-back and target priority policy may be implemented that may use a list of sorted targets provided in a referral response. Accordingly, the computer system may select and designate a target as the set target from a list of targets sorted according to site-cost to retrieve at least one requested file or directory at a client computer. Then, the computer system may determine if the set target is associated with the lowest site-cost when compared to all available targets in the sorted list. If not, the system may fail back to a different target that is associated with a lower site-cost than the set target and designate the new target as the set target.

Other advantages will become apparent from the following detailed description when taken in conjunction with the drawings, in which:

DETAILED DESCRIPTION

Exemplary Operating Environment

Figure 1:
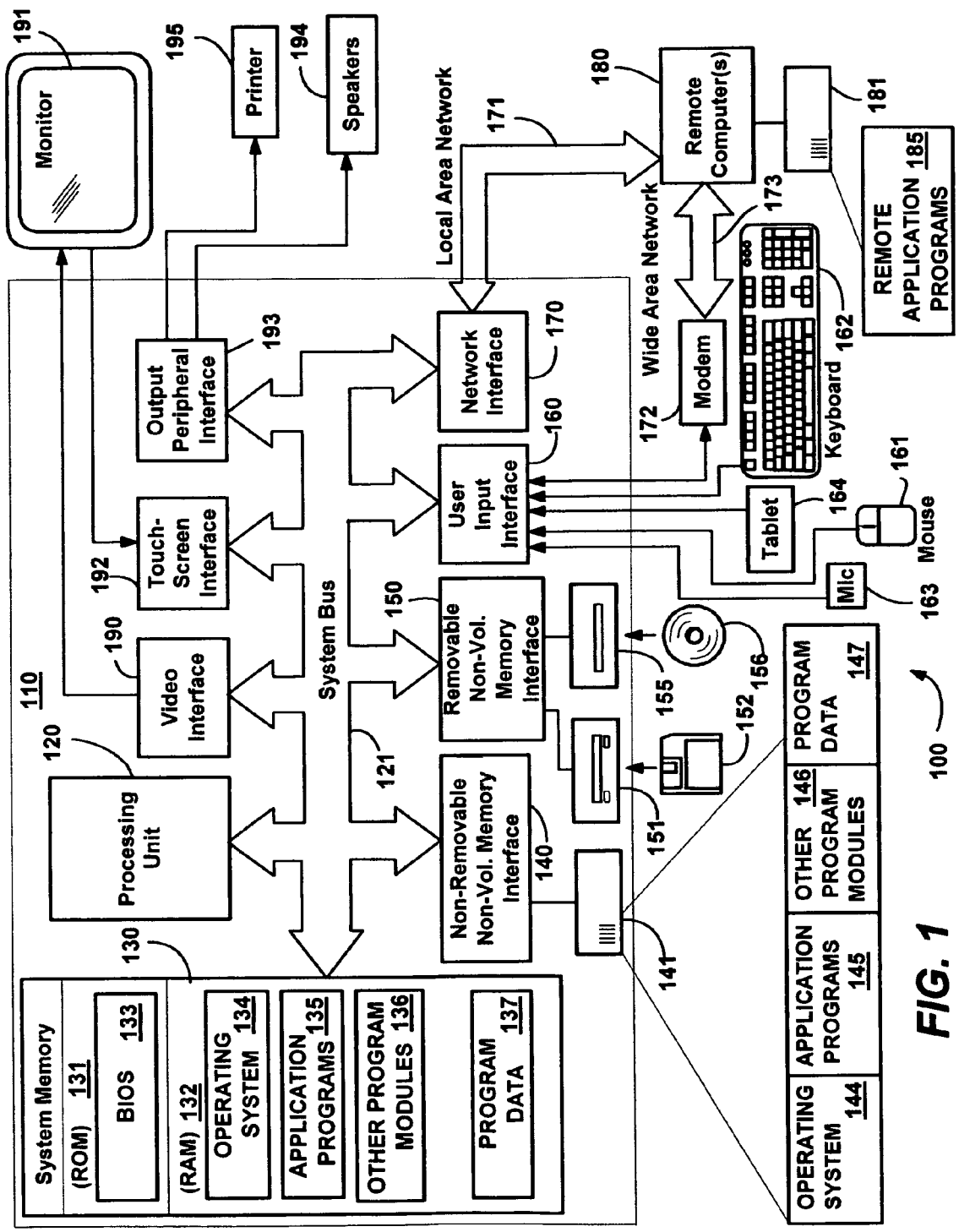
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Referral Response Sorting

The present invention is generally directed towards a system and method for determining target fail-back and target priority for a distributed file system. The system and method may advantageously provide a sorting method for a client computer requesting a list of computers that may have a desired file or directory in a network of computers. In response to a request, a list of targets that may be provided to a client computer may be sorted based on an assessment of certain parameters, including a site-cost associated with each respective target. As will be seen, the lower-cost targets identified may be sorted to the top of the referral response, so that a client computer may simply parse logically through the referral response starting with the lower-cost targets to attempt connectivity before making an attempt to establish connectivity with higher-cost targets.

Such a sorting system may also be implemented using a priority ranking of targets whereby, in one embodiment, higher priority targets may also be sorted to the top of the referral response. Furthermore, the referral response may be further sorted to include provisions for both site-cost and target-priority. Thus, groups of targets having an equivalent associated site-cost may be further sorted within the group according to an each target's respective associated target-priority. As will be understood, the various block diagrams, flow charts and scenarios described herein are only examples, and there are many other scenarios to which the present invention will apply.

Figure 2:
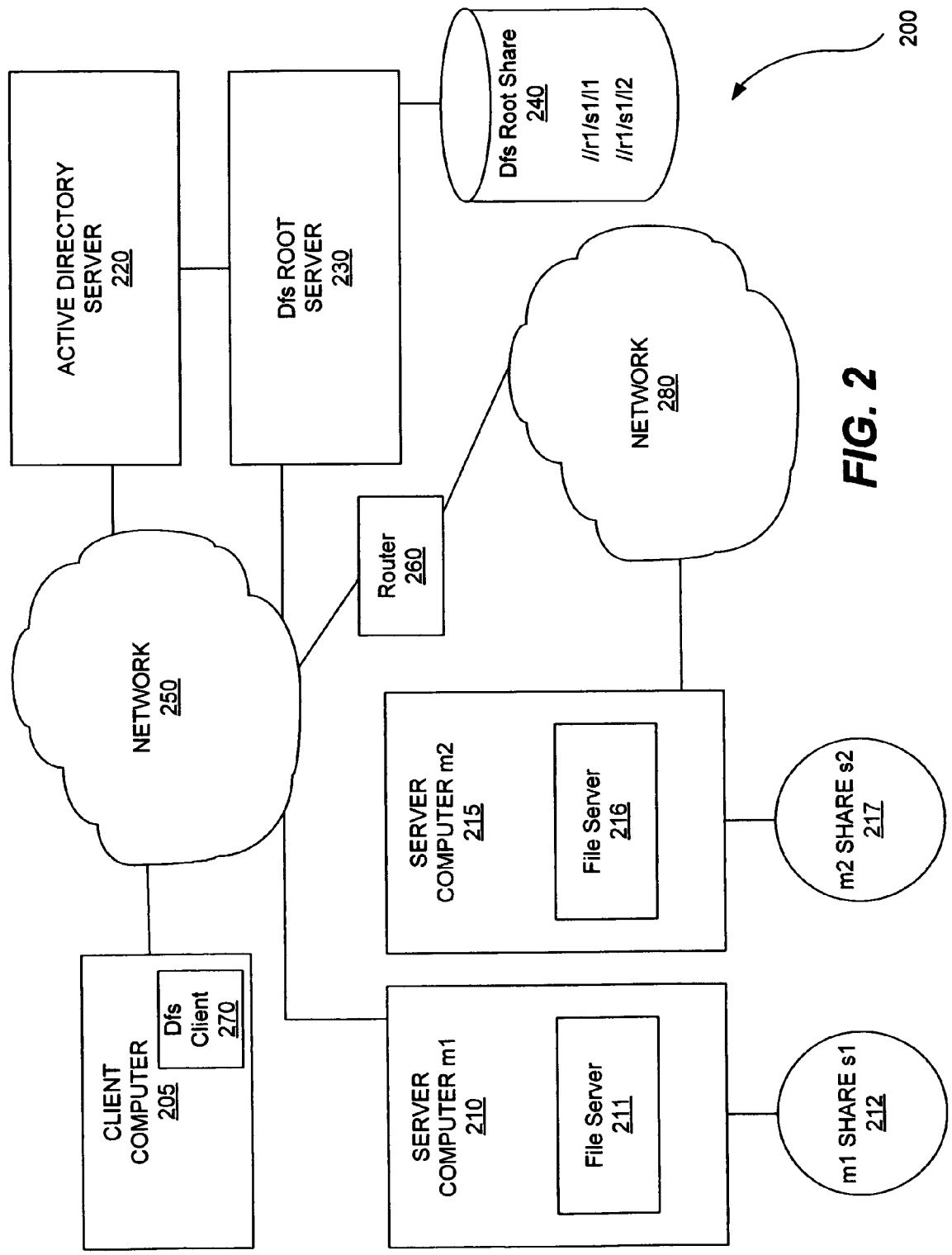
FIG. 2 is a block diagram generally representing an exemplary architecture of a distributed computing environment for implementing target fail-back and target priority in one embodiment, in accordance with an aspect of the invention.

Turning to FIG. 2 of the drawings, there is shown a block diagram generally representing an exemplary architecture of a distributed computing environment for implementing target fail-back and target priority, in accordance with an aspect of the invention. Typically, a client computer 205, which may be similar to the personal computer 110 of FIG. 1, may be operably coupled to a first network 250 which may a portion of an enterprise intranet or portion of the Internet. Client computer 205 may be part of a Dfs or may include a Dfs client 270 which may provide seamless access to files located anywhere throughout the Dfs. The network may also be operably coupled to other computers, such as server computer ml 210, active directory server 220, and Dfs root server 230. The active directory server 220 may be used to store Dfs information, including Dfs link referral information. However, in various embodiments, this information may be stored by any computer-readable medium accessible by the network 250.

In turn, the Dfs server 230 may also be operably coupled to another network 280 which may also be another enterprise intranet or another portion of the Internet. The network 280 may be operably coupled to network 250 through a router 260 as is common in any computer network. The Dfs root server 230 may be operably coupled to a Dfs root share 240 that may include one or more link referrals. For example, the link, //r1/s1/11 may provide a referral to a file or directory located at //m1/s1. Likewise, the link, //r1/s1/12 may provide a referral to a file or directory located at //m2/s1. Furthermore, a link may provide a referral to a plurality of computers, servers, shares, and/or directories. Thus, many computers, including server computer m2 215 may be communicatively coupled to the client computer 205 through a vast myriad of networks and computers.

The client computer 205 may request and retrieve files and/or directories from virtually any server location in the network 250 or networks 250 and 280. However, it may not be feasible for the client computer 205 to maintain information about all computers that may be connected to a network 250. In general, a request may be for a file or a directory. So, although any file (and/or directories and the like as is implied by file request and retrieval throughout the remainder of this disclosure) may be retrieved from any computer in the network 250, the client computer 205 is typically provided with the location of the requested file from another source. Thus, the Dfs server computer 230 may be operable to maintain information about many computers coupled to the networks 250 and 280 such that when the client computer 205 requests a file that is not locally available, the Dfs server computer 230 may provide a list of targets, wherein each target corresponds to a path to the requested file.

Typically, the Dfs server computer 230 may return many hundreds or even thousands of targets in response to a referral request and may provide an order for the targets according to a number of parameters. Two such methods for sorting the referrals may be sorting by a site-cost associated with each target and sorting by a target-priority associated with each target. Each of these sorting methods will be described in further detail below.

Once the list of targets may be sorted by the Dfs server computer 230 (or other dedicated computer systems operable to provide and sort targets in response to a referral request), it may be returned to the client computer 205. The client computer 220 may then iteratively begin attempting to establish connectivity with each target (in the order that has been sorted) until connectivity may be established with a target. A file may be located at a target corresponding to server computer ml 210 in a share s1 212, or simply //m1/s1. The share s1 212 may be associated with a file server 211 on the server computer m1 210 and, thus, may be able to be referred by the Dfs server computer 230.

Likewise, the requested file may be located on server computer m2 215 in a share s2 217. The share s2 212 may also be associated with file server 216 on the server computer m2 215 and, thus, also able to be referred by the Dfs server computer 230. However, since the server computer 215 may be operably coupled through network 280, the path that may be referred to the client computer may be more complex since the communication connection may be established through the root Dfs server 230. By using the Dfs in the architecture of FIG. 2, files from any location in the network may be retrieved through a referral provided to the client computer 205 by the Dfs server computer 230.

Figure 3:
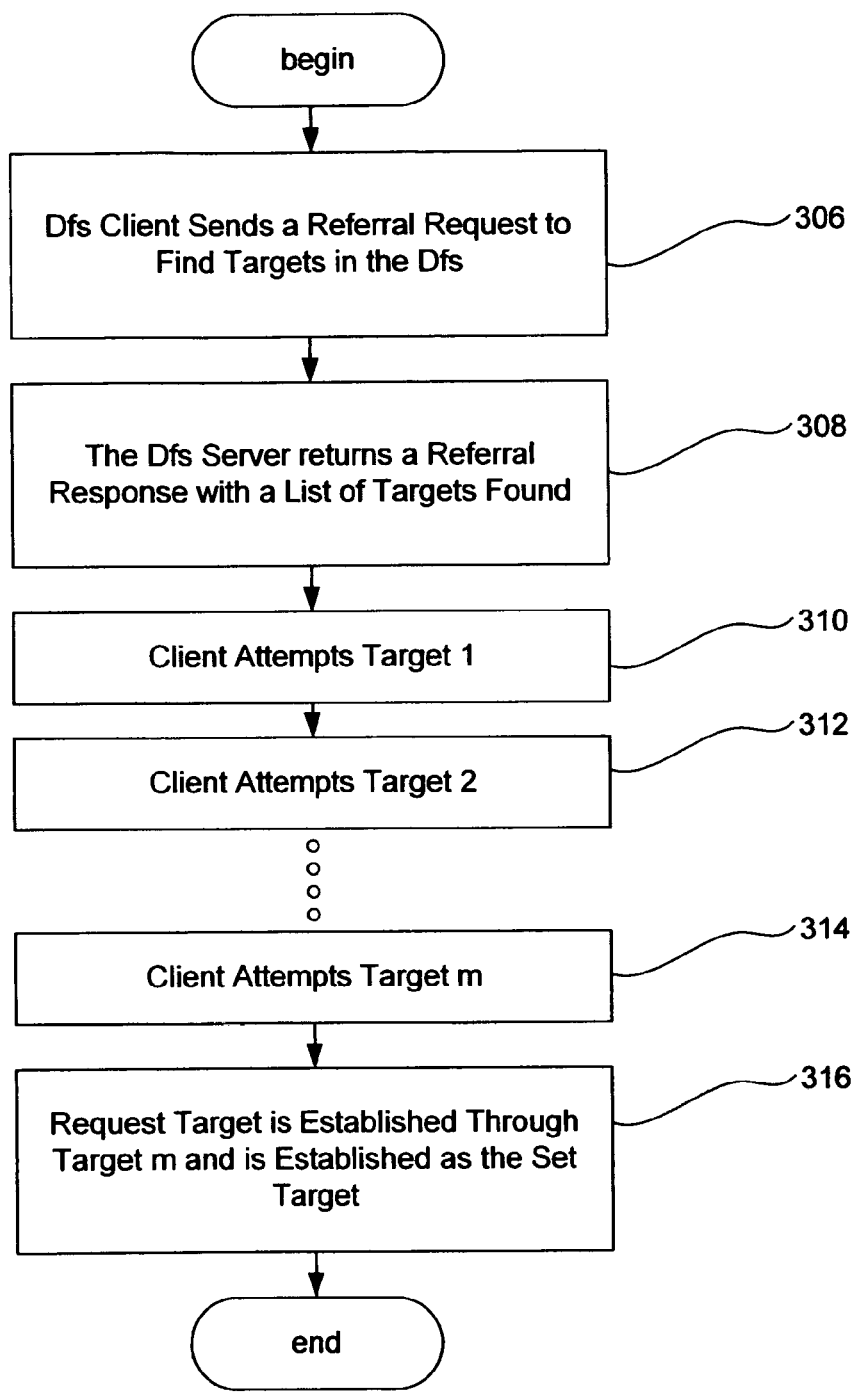
FIG. 3 is a flowchart generally representing the steps undertaken for requesting and retrieving a file using a distributed file system, in accordance with an aspect of the invention.

FIG. 3 presents a flowchart generally representing the steps undertaken for requesting and retrieving a file using a distributed file system, in accordance with an aspect of the present invention. Client computer 205 may be part of a Dfs or may include a Dfs client 270 which may provide seamless access to files located anywhere throughout the Dfs. The client computer 205 may accordingly request and retrieve files as though all files requested are found locally.

When a client computer 205 may need a particular file that is not available locally at the client computer 205, a file request may be initiated at the client computer 205 using the Dfs client 270. In various embodiments, a Dfs client may also reside on the active directory server 220 and may be used to locate the Dfs root server 230 The Dfs server computer 230 may provide a referral response to the client computer 205 that may include a list of targets corresponding to remote server computers available through the Dfs at step 308. The target list may be sorted according to various parameters such as site-cost (the method of which is described below with respect to FIG. 4), an associated priority (the method of which is described below with respect to FIG. 5), and/or site-awareness (described generally below).

Furthermore, the referral response may include an indication of bounded sets each including a grouping of targets. In one embodiment, an indication of the beginning of a bounded set may be made by providing a demarcation value associated with information about the first target in the bounded set. This may be accomplished by providing boundary attributes to the client computer in the referral response, such as a cost associated with retrieving a file or directory between a target and the client computer. The bounded sets may be based upon any number of parameters including site-cost, site-awareness, target priority, and/or health of computers involved in the referral. As used herein, health may mean the response time for providing a referral, the traffic load, the processor load, and other attributes of a computer involved in the referral, including performance metrics.

Once the client computer 205 may receive the referral response, the client computer 205 may begin attempting to establish a communication session with each target in the list in the order that was sorted. Thus, the client computer 205 may attempt target 1 at step 310 but fail to connect. The client computer 205 may then attempt target 2 at step 312, but also fail to connect. The client computer 205 may continue to attempt connections to each target in the referral response until a connection may be established with target m at step 314. When connectivity to a target may be established, the target may be designated as a set target and used until no longer available in order to preserve continuity of communication with the target. For example, target m may be established as the set target for subsequent file retrieval until the client computer 205 may request a new referral, for instance to discover a new target, or may be instructed otherwise.

Those skilled in the art will appreciate that an implementation may choose to perform theses steps in a different order or may choose only to perform some of these steps for purposes of efficiently or flexibility, while achieving the same effect and without departing from the scope of the present invention. Furthermore, this same concept may be applied to locating a Dfs server 230 in the first place as referrals for a particular Dfs server may be provided by an active directory server 220 in much the same way.

Figure 4:
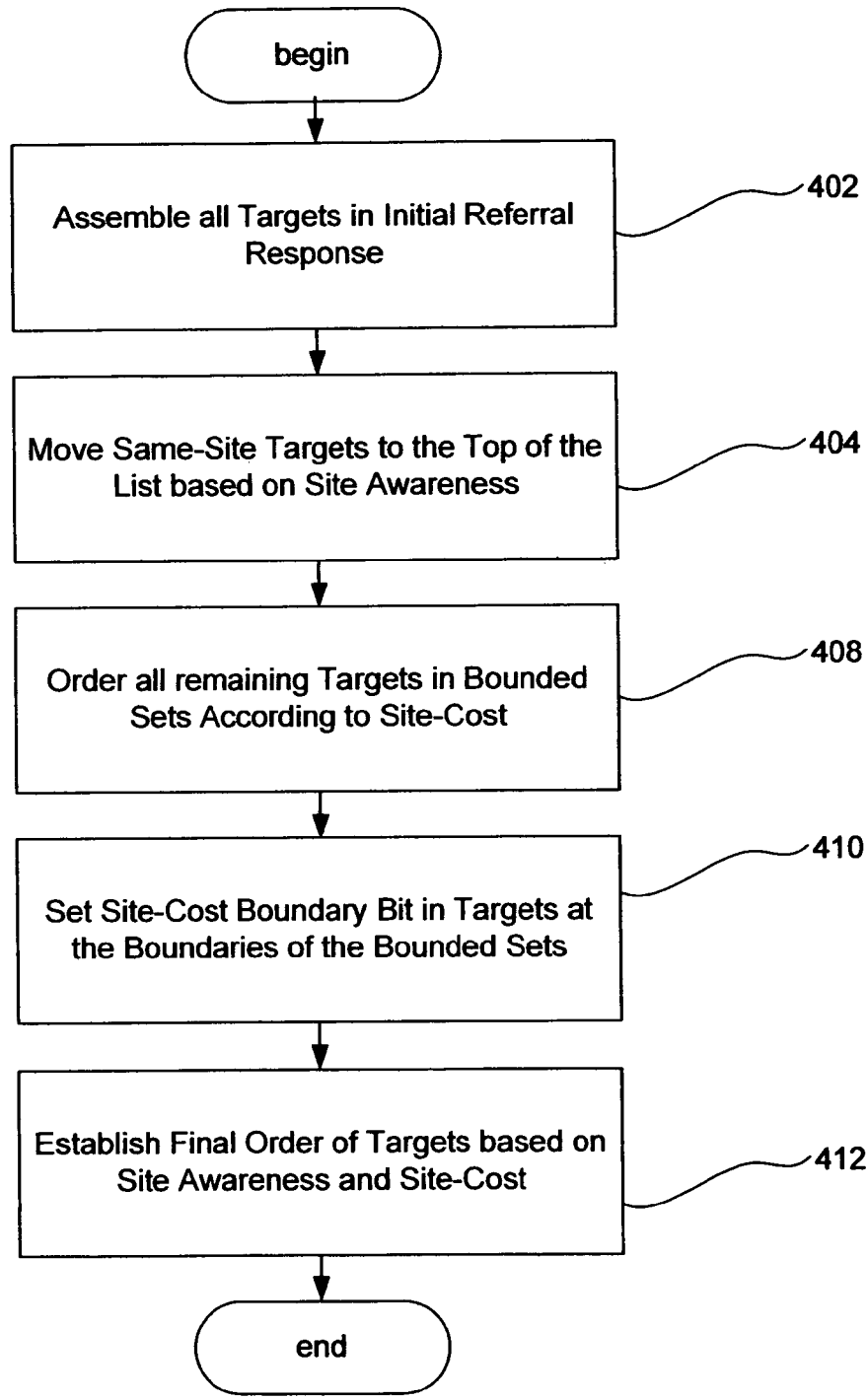
FIG. 4 is a flowchart generally representing the steps undertaken in one embodiment for assembling a referral response based on site-cost, in accordance with an aspect of the invention.

FIG. 4 presents a flowchart generally representing the steps undertaken for assembling a referral response based on site-cost in accordance with an aspect of the invention. In general, a referral response may be sorted according to a number of parameters such as by site-cost or site-awareness. In an embodiment, targets that are within the same site as the client computer 205 may be sorted according to site-awareness prior to sorting according to site-cost. For example, targets within the same site as the client computer 205 may be sorted to the top of the referral response and then site-cost parameters may be used to sort the remaining targets. FIG. 4 may present one embodiment of a method that uses site-cost and site-awareness for sorting targets in a referral response generated by the Dfs server computer 230. It may be appreciated by those skilled in the art, however, that any number of parameters or combinations of parameters may be used to sort the targets of the referral response.

The Dfs server computer 230 may compile a list of targets that may fulfill a referral request from a client computer 205. These targets may be assembled in a random order to begin with at step 402. Then, the Dfs server computer 230 may identify each target that may be within the same site (//m1/s1/, for example) as the client computer 205. At step 404, these identified targets may be moved to the top of the list to yield a referral response that is now sorted for a site-awareness parameter. In various embodiments, the referral response may be sent back to the client computer 205 at this point. However, in other embodiments, a referral response may be additionally sorted according to another parameter, site-cost, as is shown in FIG. 4.

The remaining targets may be sorted at step 408 according to an associated site-cost and separated into bounded sets. Each target having a first site-cost associated with it may be moved into a bounded set with other targets having the same associated site-cost. Likewise, a second bounded set may have one or more targets with a second associated site-cost. Thus, the list of targets may then become sorted into bounded sets wherein the first bounded set may include targets with the lowest associated site-cost, the next bounded set may include targets with the next-lowest associated site-cost, and so on.

Each bounded set may then include a large number of targets listed in a random order, but having the same site-cost associated therewith. Thus, as the client computer 205 may iterate through attempts to establish a communication session, it may cycle through the lowest site-cost targets first.

Furthermore, at step 410, the first listed target in each bounded set may also be associated with a boundary bit that may be set to indicate the beginning of a bounded set. In this manner, the client computer may easily identify the boundary between bounded sets. The boundary bit may serve as an indication that the target has a higher associated site-cost than the previous target in the list. Thus, a more informed decision about failing back or failing over may be made by providing bounded sets based on site-costing. The Dfs server computer 230 may then assemble a final referral response having a sorted list of targets based on site-awareness and site-cost and may forward the referral response back to the client computer 205 at step 412.

Figure 5:
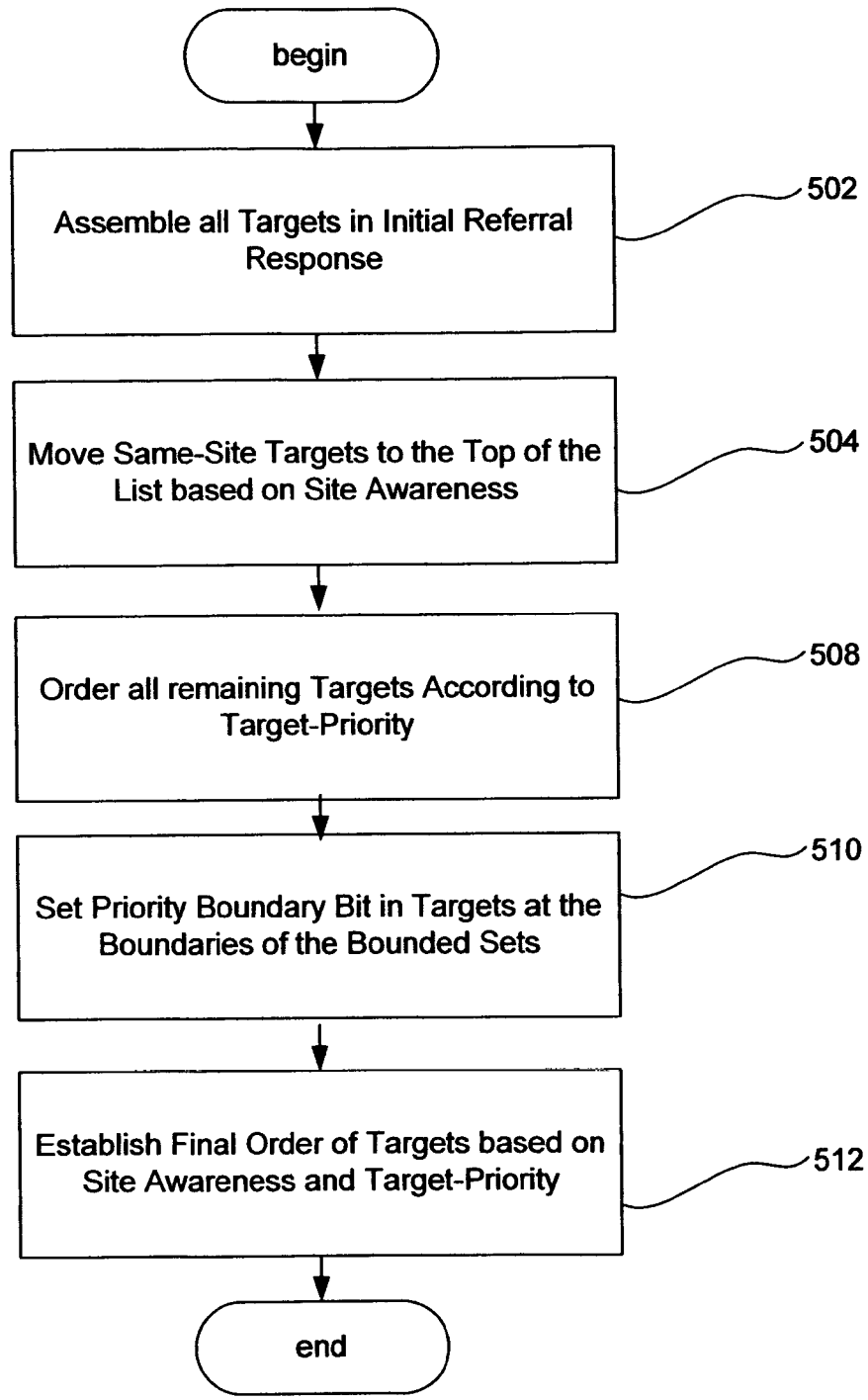
FIG. 5 is a flowchart generally representing the steps undertaken in one embodiment for assembling a referral response based on target-priority, in accordance with an aspect of the invention.

FIG. 5 presents a flowchart generally representing the steps undertaken for assembling a referral response based on target-priority in accordance with an aspect of the invention. Again, a referral response may be sorted according to a number of parameters such as by target-priority and/or site-awareness as briefly mentioned above. FIG. 5 may present one embodiment of a method that uses target-priority and site-awareness for sorting targets in a referral response generated by the Dfs server computer 230. It may be appreciated by those skilled in the art, however, that any number of parameters or combinations of parameters may be used to sort the targets of the referral response. As discussed above, the Dfs server computer 230 may compile a list of targets that may fulfill a referral request from a client computer 205. These targets may be assembled in a random order to begin with at step 502. Then, the Dfs server computer 230 may identify each target that is within the same site (//m1/s1/, for example) as the client computer 205. At step 504, these identified targets may be moved to the top of the list to yield a referral response that is now sorted for a site-awareness parameter. In some embodiments, the referral response may be sent back to the client computer 205 at this point. However, in other embodiments, a referral response may be additionally sorted according to another parameter, target-priority, as is shown in FIG. 5.

Each target having a first target-priority, such as global high, associated with it may be moved into a bounded set with other targets having the same associated target-priority Likewise, a second bounded set may have one or more targets with a second associated target-priority, such as global low. Thus, the list of targets then may be sorted into bounded sets wherein the first bounded set may include targets with the highest associated target-priority, i.e., global high, the next bounded set includes targets with the next-highest associated target-priority, i.e., normal high, and so on.

Each bounded set may then include a large number of targets listed in a random order, but having the same target-priority associated therewith. Thus, as the client computer 205 may iterate through targets and attempt to establish a communication session, it may cycle through the highest target-priority targets first.

Furthermore, at step 510, the first listed target in each bounded set may also have a boundary bit set to indicate the beginning of the bounded set. In this manner, the client computer 205 may easily identify the boundary between bounded sets. The boundary bit may serve as an indication that the target may have a lower associated target-priority than the previous target in the list. Thus, a more informed decision about failing back or failing over may be made by providing bounded sets based on target-priority. The Dfs server computer 230 may then assemble a final referral response having a sorted list of targets based on site-awareness and target-priority and may forward the referral response back to the client computer 205 at step 512.

The Dfs server computer 230 may also use a combination of sorting parameters in establishing the sorted referral response. For example, a first sorting may be to move same-site targets to the top of the list. Then, targets may be sorted based on global priorities associated with each. For example, all targets having an associated global high priority may be sorted to the top of the referral response. Likewise, all targets having an associated global low priority may be sorted to the bottom of the list. Then, the remaining targets (which may be referred to as global normal) may be sorted further into bounded sets based on site-cost.

In another embodiment, a second sorting may establish bounded sets based on site-costs and denoted by set boundary bits in the targets at the top of each set. Then, each bounded set may be sorted according to target-priority such that within each bounded set (which may inherently have the same associated site-cost) the targets may further be ordered according to a priority associated with each target. Thus, within the bounded sets based on site-cost, the targets at the top of the bounded set may be associated with a high priority, the next grouping of targets may be associated with the next highest priority (normal, for example), and so on.

In yet another embodiment, the previous two embodiments may be implemented together such that targets are sorted by priority on a global basis and within each bounded set.

As another example, a first sorting may again be to move same-site targets to the top of the list. Then a second sorting may establish bounded sets based on target-priority and denoted by set boundary bits in the targets at the top of each set. Then, each bounded set may be sorted according to site-cost such that within each bounded set (which may inherently have the same associated target-priority) the targets are further ordered according to a site-cost associated with each target. Thus, within the bounded sets based on target-priority, the targets at the top of the bounded set may be associated with the lowest site-cost, the next grouping of targets may be associated with the next lowest site-cost, and so on.

By sorting targets in a referral response in an established order and setting certain bits within each target in the referral response, a client computer may then implement an efficient target fail-back policy and priority fail-back policy using the sorted targets in the referral response as will be described below.

Target Failback and Priority

In addition to the sorting method for a client computer requesting a list of server computers that may have a desired file in a network of server computers, the system and method may also advantageously provide a target fail-back and target priority policy that may use a list of sorted targets provided in a referral response. As will be seen, a computer system may select and designate a target as the set target from a list of targets sorted according to site-cost. Then, the computer system may determine if the set target is associated with the lowest site-cost when compared to all available targets in the sorted list. If not, the system may fail back to a different target that is associated with a lower site-cost than the set target and designate the new target as the set target. As will be appreciated, the various flow charts and scenarios described herein are only examples, and there are many other scenarios to which the target fail-back and target priority policy described will apply.

Figure 6:
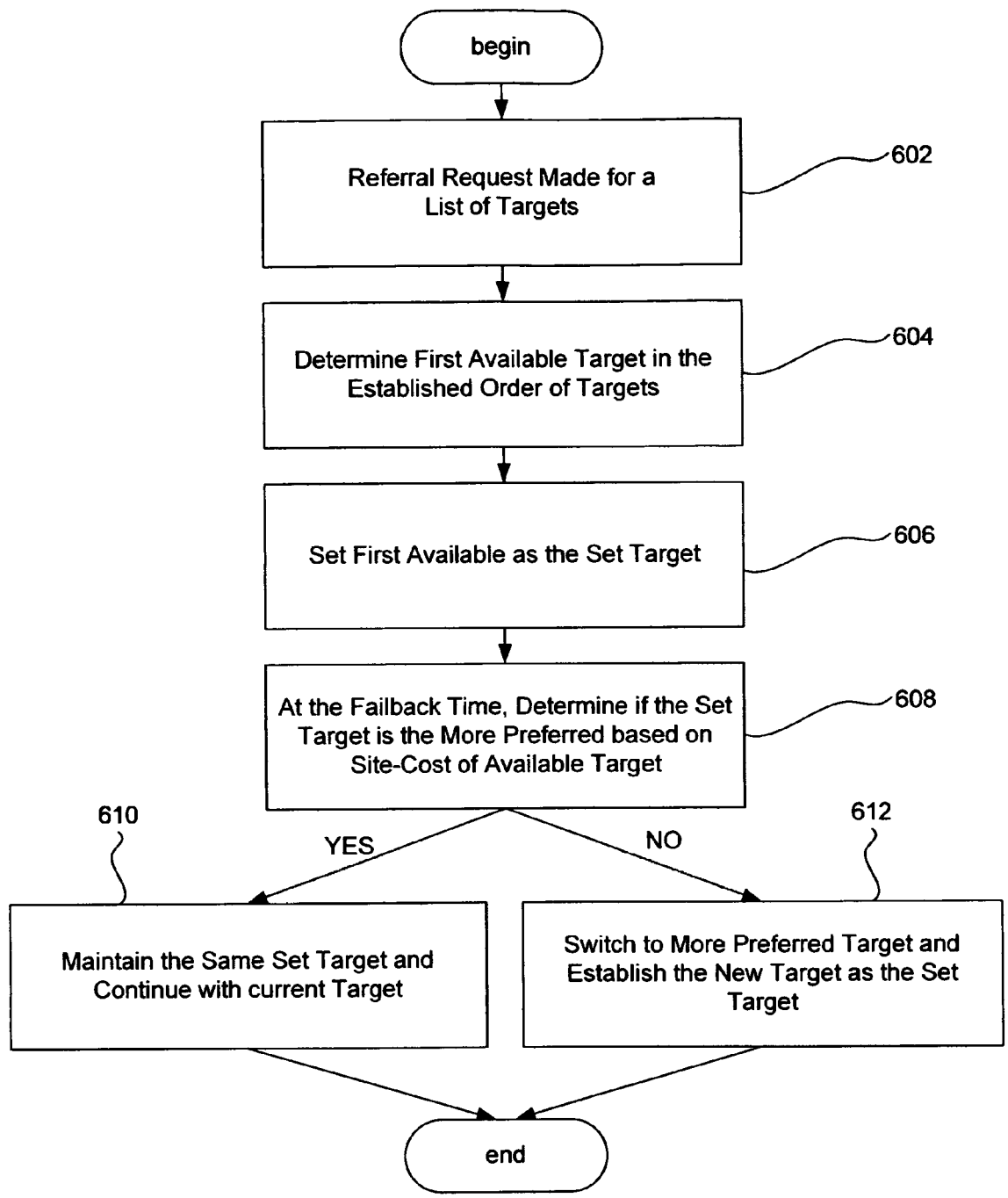
FIG. 6 is a flowchart generally representing the steps undertaken in one embodiment for failing back to lower site-cost target that may be used with a sorted referral response, in accordance with an aspect of the invention.

Turning to FIG. 6 of the drawings, there is shown a flowchart generally representing the steps undertaken for failing back to lower site-cost target that may be used with a sorted referral response in accordance with an aspect of the invention. In various embodiments of a target fail-back policy environment, the Dfs server computer 230 may sort information about targets that may be used by Dfs when generating a referral response. In one embodiment, the Dfs server computer 230 may sort information about targets based-on site-awareness. In this mode, the referral response may essentially consist of two target-sets: one set containing the targets in the same site as the client computer 205 and the other set containing targets in sites other than the client computer 205. Initially, targets in each set may be ordered randomly.

In another embodiment, the Dfs server computer 230 may sort referrals may be based on a site-cost. In this mode of operation, the referral response may be sorted into multiple bounded-sets. Each bounded-set may include targets having the same site-cost as determined by the Dfs-server (which may be determined based on site-cost information related to the requesting client computer). The bounded-sets may be ordered by increasing site-cost, such that targets in the same site as the client may be in the first bounded-set; targets having the next lowest site-cost may be in the second set, and so on. Initially, targets within each set may be ordered randomly.

Thus, when a client computer requests a referral at step 602, a sorted referral response may be provided by the Dfs server computer 230. The client computer then may begin attempting to establish connectivity with each target in the referral response to determine the first available target at step 604. When a target may not be accessible for any number of reasons such as network errors, target crashing, etc., the Dfs client may fail over to the next available target. For example, an attempt may be made to establish connectivity with the next target in the list of targets in the referral response. When connectivity may be established with a target, the particular target may be designated as the set target at step 606.

When one or more previous targets that may be more optimal than the set target become available again, the DFS client may continue to use the set target for purposes of continuity and seamlessness, or may acquire or reacquire a more optimal target available. Advantageously, having a fail-back policy and bounded sets of targets allows for a more optimal target, such as a target with a lower site-cost, to be acquired or reacquired when available.

Thus, if the target fail-back policy specifies (for example, having a target fail-back policy bit set), the client computer may determine that a more preferred target, such as a lower site-cost target, may be available at step 608. The determination may be made at any time and may be initiated by the client computer 205, the Dfs server computer 230, or any other remote computer. Furthermore, the fail-back time may correspond to an elapsed amount of time from the time that connectivity may have been established with the set target. For example, the client computer may check for a more optimal target after 30 minutes since connectivity for the first set target was established. Further yet, the fail-back time may correspond to a particular time of day, such as every half hour or every five minutes. Still further, the fail-back time may correspond to the very next request for a file from the client computer 205.

At the fail-back time, if a more preferred target such as a lower site-cost target may be available, then connectivity may be established with the available more preferred target and the available more preferred target may be designated the set target at step 612. However, if there may not be any more preferred target available, such as with a lower site-cost, then the set target may continue to be used as the current target at step 610.

The fail-back policy may be implemented for a given Dfs root/link in the referral response. If target fail back may not be enabled at an individual link level, the setting for the entire Dfs namespace may be used. In one embodiment, target fail-back may be disabled at the link level when target fail-back may be enabled at the Dfs namespace level.

The target fail-back information may be stored in one embodiment along with other Dfs information, such as Dfs meta data. For example, a "Type" field in the per-root/link information of the meta data of each target may be used. A free bit position in this field may be identified and verified to work across legacy systems. This new bit position may be defined to be PKT_ENTRY_TYPE_TARGETFAIL.BACK.

Thus, a typical format for meta data for domain-based Dfs (referred to as the "ID BLOB") may be defined in an embodiment by the pseudo-structure below:

| | |
|---|---|
| GUID | VolumeId; |
| USHORT | PrefixLength; |
| WCHAR | Prefix [PrefixLength]; |
| USHORT | ShortPrefixLength; |
| WCHAR | ShortPrefix[ShortPrefixLength]; |
| ULONG | Type; |
| ULONG | State; |
| USHORT | CommentLength; |
| WCHAR | Comment[CommentLength]; |
| FILETIME | PrefixTimeStamp; |
| FILETIME | StateTimeStamp; |
| FILETIME | CommentTimeStamp; |
| ULONG | Version; |

Likewise, a typical format for meta data for stand-alone Dfs (referred to as the "ID BLOB") may be defined by the pseudo-structure below:

| | |
|---|---|
| USHORT | PrefixLength; |
| WCHAR | Prefix[PrefixLength]; |
| USHORT | ShortPrefixLength; |
| WCHAR | ShortPrefix [ShortPrefixLength]; |
| GUID | VolumeId; |
| ULONG | State; |
| ULONG | Type; |
| USHORT | CommentLength; |
| WCHAR | Comment[CommentLength]; |
| FILETIME | PrefixTimeStamp; |
| FILETIME | StateTimeStamp; |
| FILETIME | CommentTimeStamp; |

The NetDfsGetInfo/NetDfsEnum APIs may retrieve the setting from the per-root/link meta data. The API front end, which may validate parameters may be modified accordingly, and the routine which may interpret and return the "info level" specific information may also be modified accordingly.

To support both target priority and target fail-back, a Dfs client may attempt fail-back to another target of lower site-cost and/or higher priority. In one embodiment, a Dfs client may not fail back to another target at the same site-cost and/or same priority as the currently active target.

A target-set may be defined in an embodiment to be a bounded-set of targets. For example a bounded-set of targets may be a set of randomly sorted targets having the same site-cost. An indication of a boundary for a bounded-set of targets may be made, for example, in a referral response by including an indication of a boundary in a referral entry.

Accordingly, a referral response to a Dfs client for a root/link may indicate in an embodiment whether or not fail-back is enabled for the root/link and may also indicate the bounded-set boundaries between the targets returned. In one embodiment, the format of a previously existing referral response for a root/link may be used by adding a new bit field in the existing bit field definitions in both the referral header and referral entry as follows:

```
typedef struct {
    USHORT PathConsumed; // Number of WCHARs consumed in
            DfsPathName
    USHORT NumberOfReferrals; // Number of referrals
            contained here
    struct {
        ULONG ReferralServers : 1; // Elements in
                Referrals[ ] are referral servers
        ULONG StorageServers : 1; // Elements in Referrals[ ]
                are storage servers
        ULONG TargetFailback : 1; // Target Fail-back is
                enabled for this namespace root/link
    };
        ULONG ReferralHeaderFlags
    };
    union { // The vector of referrals
        DFS_REFERRAL_V1 v1;
        DFS_REFERRAL_V2 v2;
        DFS_REFERRAL_V3 v3;
        DFS_REFERRAL_V4 v4;
    } Referrals[i]; // [ NumberOfReferrals ]
    //
    // WCHAR String Buffer[ ];// Used by DFS . . .
            REFERRAL_V2
    //
} RESP_GET_DFS_REFERRAL;
typedef RESP_GET_DFS_REFERRAL
    *PRESP_GET_DFS_REFERRAL;
typedef struct {
    USHORT VersionNumber; // == 4
    USHORT Size; // Size of this whole element
    USHORT ServerType;    // Type of server: 0 == Don't know,
            1 == SMB, 2 == Netware
    union {
        struct {
            USHORT StripPath : 1; // Strip off PathConsumed
                    characters from front of DfsPathName prior to
                    submitting name to UncShareName
            USHORT NameListReferral : 1; // This referral
                    contains an expanded name list
            USHORT TargetSetBoundary : 1 // Denotes this target
                    is the first in a target set // All targets in
                    have the same site-cost or priority rank;
        };
        USHORT ReferralEntryFlags
    };
    ULONG TimeToLive; // In number of seconds
    union {
        struct {
            USHORT DfsPathOffset;    // Offset from beginning of
                    this element to Path to access
            USHORT DfsAlternatePathOffset; // Offset from
                    beginning of this element to 8.3 path
            USHORT NetworkAddressOffset; // Offset from
                    beginning of this element to Network path
            GUID ServiceSiteGuid;    // The guid for the site
        };
        struct {
            USHORT Special NameOffset;    // Offset from this
                    element to the special name string
            USHORT NumberOfExpandedNames; // Number of expanded
                    names
```

```
            USHORT ExpandedNameOffset; // Offset from this
                element to the expanded name list
    };
    } DFS_REFERRAL_V4;
    typedef DFS_REFERRAL_V4 *PDFS_REFERRAL_V4;
```

Those skilled in the art will appreciate that other data structures, such as a separate data structure, may be used for providing an indication of bounded-set boundaries between targets in a referral response or for indicating whether or not fail-back may be enabled.

Figure 7:
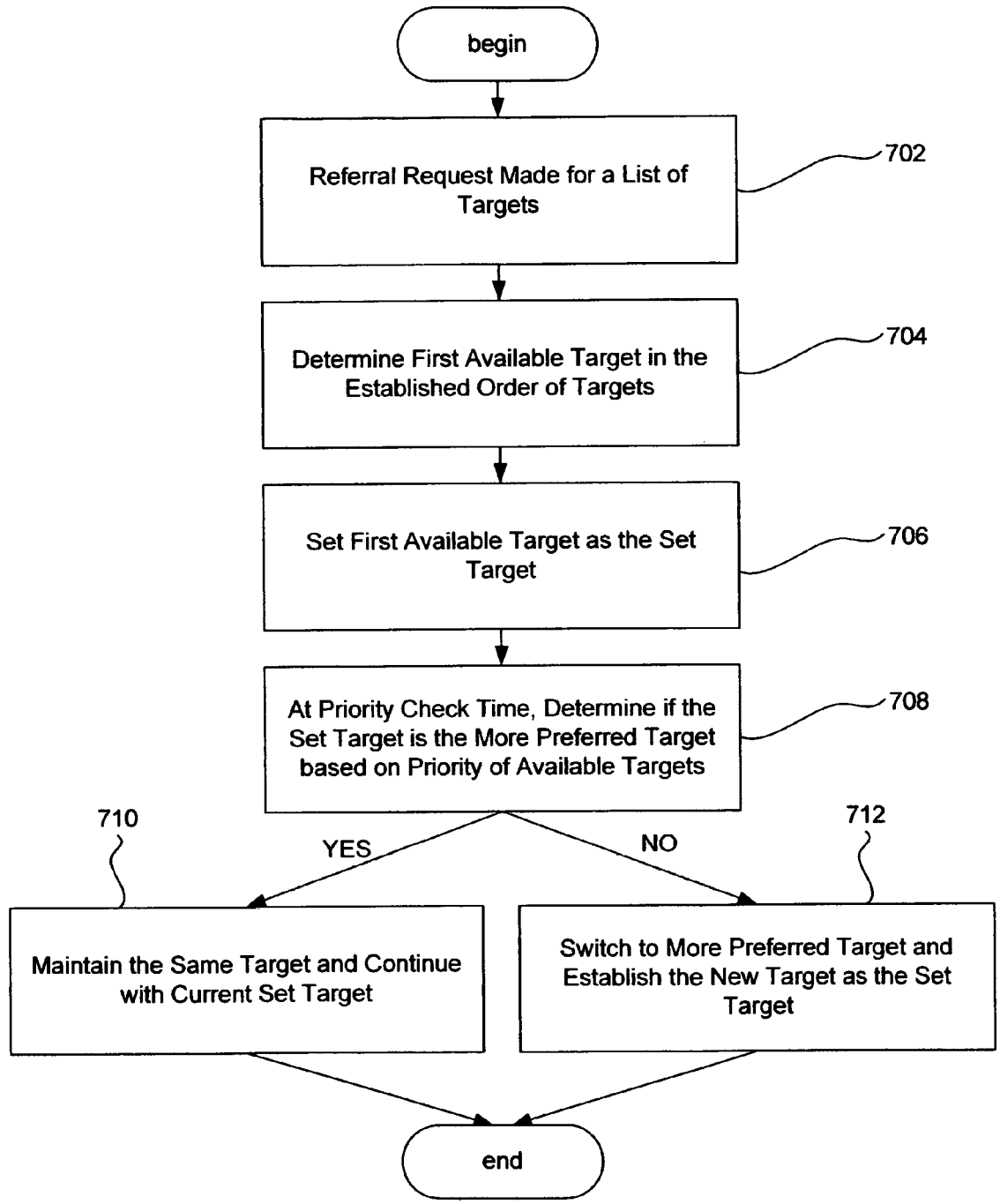
FIG. 7 is a flowchart generally representing the steps undertaken in one embodiment for failing back to a higher priority target that may be used with a sorted referral response, in accordance with an aspect of the invention.

FIG. 7 presents a flowchart generally representing the steps undertaken for failing back to a higher priority target that may be used with a sorted referral response in accordance with an aspect of the invention. In various embodiments of a target fail-back policy environment, the Dfs server computer 230 may sort information about targets based-on site-awareness. In this mode, the referral response may essentially consist of two target-sets: one set containing the targets in the same site as the client computer 205 and the other set containing targets in sites other than the client computer 205. Initially, targets in each set may be ordered randomly.

In another embodiment, the Dfs server computer 230 may sort referrals based on a target-priority. In this mode of operation, the referral response may be sorted into multiple bounded-sets. Each bounded-set may include targets that may have the same target-priority as determined by the Dfs server requesting the referral. The bounded-sets may be ordered in terms of decreasing target-priority, such that targets of highest priority may be in the first bounded-set; targets having the next highest-priority may be in the second set, and so on. Initially, targets in each set may be ordered randomly.

The Dfs server computer 230 may also use a combination of sorting parameters in establishing the sorted referral response. For example, a first sorting may be to move same-site targets to the top of the list. Then, targets may be sorted based on global priorities associated with each. For example, all targets having an associated global high priority may be sorted to the top of the referral response. Likewise, all targets having an associated global low priority may be sorted to the bottom of the list. Then, the remaining targets (which may be referred to as global normal) may be sorted further into bounded sets based on site-cost.

In another embodiment, a second sorting may establish bounded sets based on site-costs and denoted by set boundary bits in the targets at the top of each set. Then, each bounded set may be sorted according to target-priority such that within each bounded set (which may inherently have the same associated site-cost) the targets may further be ordered according to a priority associated with each target. Thus, within the bounded sets based on site-cost, the targets at the top of the bounded set may be associated with a high priority, the next grouping of targets may be associated with the next highest priority (normal, for example), and so on.

In yet another embodiment, the previous two embodiments may be implemented together such that targets are sorted by priority on a global basis and within each bounded set. Thus, when a client computer 205 requests a referral at step 702, a sorted referral response may be provided by the Dfs server computer 230. The client computer may then begin attempting to establish connectivity with each target in the referral response to determine the first available target at step 704. For example, an attempt may be made to establish connectivity with the next target in the list of targets in the referral response. When connectivity may be established with a target, the particular target may be designated as the set target at step 706.

When one or more previous targets that may be more optimal than the set target become available again, the DFS client may continue to use the set target for purposes of continuity and seamlessness, or may acquire or reacquire a more optimal target available. Advantageously, having a fail-back policy and bounded sets of targets allows for a more optimal target, such as a target with a higher target-priority, to be acquired or reacquired when available.

Thus, if the target fail-back policy specifies (for example, having a target fail-back policy bit set), the client computer may determine that a more preferred target, such as a target within a more preferred bounded set, is available at step 708. The determination may be made at any time and may be initiated by the client computer 205, the Dfs server computer 230, or any other remote computer. Furthermore, the priority check time may correspond to an elapsed amount of time since establishing the set target. For example, the client computer 205 may check for a more optimal target after 30 minutes since the first set target was established. Further yet, the priority check time may correspond to a particular time of day, such as every half hour or every five minutes. Still further, the priority check time may correspond to the very next request for a file from the client computer 205.

At the priority check time, if a higher target-priority target may be available, then connectivity may be established with the available higher target-priority target and the higher target-priority target may be designated as the set target at step 712. However, if there may not be any target available with a higher target-priority, then the set target may continue to be used as the current target at step 710.

Thus a simple method of ranking targets within Dfs itself may provide useful sorting advantages. Server target priority may coincide with site-costing as described above. Server target priority may create a hard ranking between targets such that a lower priority target may not receive traffic if the higher priority target is available.

As described above, a referral response may be sorted into bounded sets based on each target's associated site-cost. With server target priority, these bounded sets may still be based on the cost of accessing targets. Server target priority may simply extend the cost sorting criteria for targets, so the sets may be those targets having the same site-cost and server target priority.

Server target priority may be represented in one embodiment by two values: a priority class and a priority rank. Priority classes may be defined at two levels: locally, within sets of targets of equal site-cost, and globally. Within each of these, there may be a coarse ordering of high, normal and low priority targets. This may provide five priority classes:

Global high
Site-cost high
Site-cost normal
Site-cost low
Global low which may be ordered in the priority listed. Note that there may not be any separate "global normal" class since that may be considered equivalent to the site-cost classes. Priority rank may be a simple integer ranking –0, 1, 2, and so forth.

In ordering a referral, the process in one embodiment may be as follows:

1. the sets of global high and global low targets may be identified, along with the remaining "global normal" targets
2. these three sets may be placed in priority order of global high, global normal and global low.
3. if an exclusion policy may be set, then targets within the exclusion set may be removed.
4. within each of these three sets, the targets may be ordered by the site-cost mechanism (either local site or by full site-costing), producing bounded sets of targets of equal site-cost
5. within the sets of "global normal" targets of equal site-cost, targets may be ordered by priority class i.e., site-cost high, normal and low.
6. within the bounded sets of targets of equal site-cost and priority class, targets may be ordered by priority rank (0 being the highest).
7. within the bounded sets of targets of equal site-cost, priority class and priority rank, targets may be randomly shuffled for load balancing.

Those skilled in the art will appreciate that an implementation may choose to perform theses steps in a different order or may choose only to perform some of these steps for purposes of efficiently or flexibility, while achieving the same effect and without departing from the scope of the present invention.

Graphically, these may be the sets in the order in which a client would receive targets:

```
[global high priority class]
[site-cost   high priority class for targets of site-cost=0]
[            normal                           cost=0]
[            low                              cost=0]
[site-cost   high priority class for targets of site-cost=1]
[            normal                           cost=1]
[            low                              cost=1]
[global low priority class]
```

Since the target-priority information may be on a per-target basis, the natural place for maintaining this information may be in the Dfs replica meta data information which includes the list of targets for each root/link. Each target's information may be defined by the pseudo-structure below:

```
FILETIME    ReplicaTimeStamp;
ULONG       ReplicaState;
ULONG       ReplicaType;
USHORT      ServerNameLength;
WCHAR       ServerName[ServerNameLength];
USHORT      ShareNameLength;
WCHAR       ShareName[ShareNameLength];
```

In one embodiment, target priority may be encoded in a UCHAR for storing in the meta data:
Bits 0-4: priority rank within priority class
Bits 5-7: priority class
The priority classes may be represented in an embodiment by the following values:

```
Site-cost normal (Default)    0x0
Global high                   0x1
Global low                    0x2
Site-cost high                0x3
Site-cost low                 0x4
```

As an example, a target of priority rank 1 within the global low priority class may be encoded as

| Bit | 765/43210 |
|---|---|
|  | 010/00001 |

This encoding may provide for 32 priority-ranks, and 8 possible priority classes, of which 5 may be defined using the priority rank of global high, site-cost high, site-cost normal, site-cost low, and global low. Priority rank may be a value from 0 to 31, with 0 considered the highest priority. Thus targets with priority rank 0 may be returned first and those with priority rank 31 may be returned last within each set.

A utility, such as DfsUTIL, may be used to expose the priority class definitions directly for set/view operations. Alternatively, a user interface may expose the priority classes via radio buttons on the target property page. Both DfsUTIL and the UI may choose "site-cost normal priority class" as the default.

Target priority may be considered an attribute of a Dfs target. Accordingly, the above UCHAR value may be stored as a per-target attribute in the Dfs object, both in the active directory and registry, in one embodiment. A new DFS_REPLICA_INFORMATION structure may be provided as following:

```
typedef struct DFS_REPLICA_INFORMATION
{
    PVOID           pData;
    ULONG           DataSize;
    UCHAR           TargetPriority;
    UCHAR[7]        Unused;
    ULONG           ReplicaState;
    ULONG           ReplicaType;
    UNICODE STRING  ServerName;
    UNICODE STRING  ShareName;
    DFS_REPLICA_INFORMATION,
    *PDFS_REPLICA_INFORMATION;
}
```

DFS_TARGET_PRIORITY_CLASS may provide a new enum type that may define five possible target priority class settings in one embodiment:

```
typedef enum {
    DfsInvalidPriorityClass = -1,
    DfsSiteCostNormalPriorityClass 0,
    DfsGlobalHighPriorityClass,
    DfsSiteCostHighPriorityClass,
    DfsSiteCostLowPriorityClass,
    DfsGlobaLowPriorityClass
}DFS TARGET PRIORITY CLASS;
```

The default target priority setting may be <PriorityClass=SiteCostNormalPriorityClass, PriorityRank=0>. This may be by design since the default value of downlevel meta data will be 0. The value for DfsSiteCostNormalPriorityClass may be 0 even though it may be lower in priority compared to DfsSiteCostHighPriorityClass.

The following structure may be provided to encapsulate the definition of target priority which may be the tuple <priority class, priority rank> in one embodiment:

```
typedef struct _DFS_TARGET_PRIORITY {
    DFS_TARGET_PRIORITY_CLASS    TargetPriorityClass;
    USHORT                       TargetPriorityRank;
    USHORT                       Reserved;
} DFS_TARGET_PRIORITY;
```

DfsReplica class which may represent a root or link target in Dfs service may contain an instance of a new Class DfsTargetPriority:

```
class DfsTargetPriority (
    private:
        DFS_TARGET_PRIORITY _TargetPriority;
```

DfsTargetPriority class may convert the packed UCHAR containing target priority information taken from the DFS meta data to the more usable DFS_TARGET_PRIORITY form. It may also create the packed UCHAR value given DFS_TARGET_PRIORITY. It also may perform the mapping between the priority class definition of DFS_TARGET_PRIORITY_CLASS and the priority class definition used for storing in the meta data.

An existing struct REPLICA_COST_INFORMATION may be converted to a new class called DfsTargetCostInfo:

```
class DfsTargetCostInfo
    private:
        ULONG TargetCost;    // Site-cost
        DfsReplica *pReplica;  //  Server priority is an
            attribute of DfsReplica BOOLEAN IsBoundary;
    public:
        BOOLEAN operator<=(DfsTargetCostInfo &rhs);
        BOOLEAN operator!={DfsTargetCostInfo &rhs);
        DfsTargetCostInfo& operator=(const DfsTargetCostInfo
            &rhs);
```

The existing struct REFERRAL_INFORMATION may be converted to a class that will contain an array of DfsTargetCostInfo objects. The logic regarding shuffling, sorting and generating referrals may be encapsulated in this new class. This class may also convert the generated array of DfsTargetCostInfo objects into REFERRAL_HEADER format which the DFS protocol expects.

Sorting referrals by target priority may be implemented as follows. Given two targets, r1 and r2, r1 may be considered<=r2 if r1 needs to be ordered before r2. So, if r1<=r2, the sorted referral will look like {r1, r2}. The implementation for that<=comparison relies on the following observation:

For targets in the global priority class, priority classes may be compared first. And for targets in the non-global priority classes, site-costs may be compared first.

1. If one or both targets may be in a global priority class:
    a. If priority classes may not be the same, determine the ordering based on the priority class. For example, if r1 may be in DfsGlobalHighPriorityClass, r1 may be ordered before r2 independent of r2's priority class.
    b. Else, priority classes may be the same, compare site-costs of r1 and r2. r1<r2 if site-cost of r1<site-cost of r2.
    c. Priority classes and site-costs may be the same, go to step 3.

2. Neither target may be in a global priority class:
    a. If target site-costs may not be the same, r1<r2 if site-cost of r1<site-cost of r2.
    b. Else site-costs may be the same, and so check priority classes. r1<r2 if r1 may be in a higher priority class compared to r2.
    c. Site-costs and priority classes may be the same, go to step 3.

3. Priority classes and site-costs may be the same. r1<r2 if r1 may have a higher priority rank (numerically lower) compared to r2.

For the global priority classes, referrals may be first ordered by site-costs and then ordered by priority ranks. This may occur because that may be the model for comparisons in other cases. For example, for priority classes which are not global, only the priority-rank may be taken into account when site-costs are equal.

Figure 8:
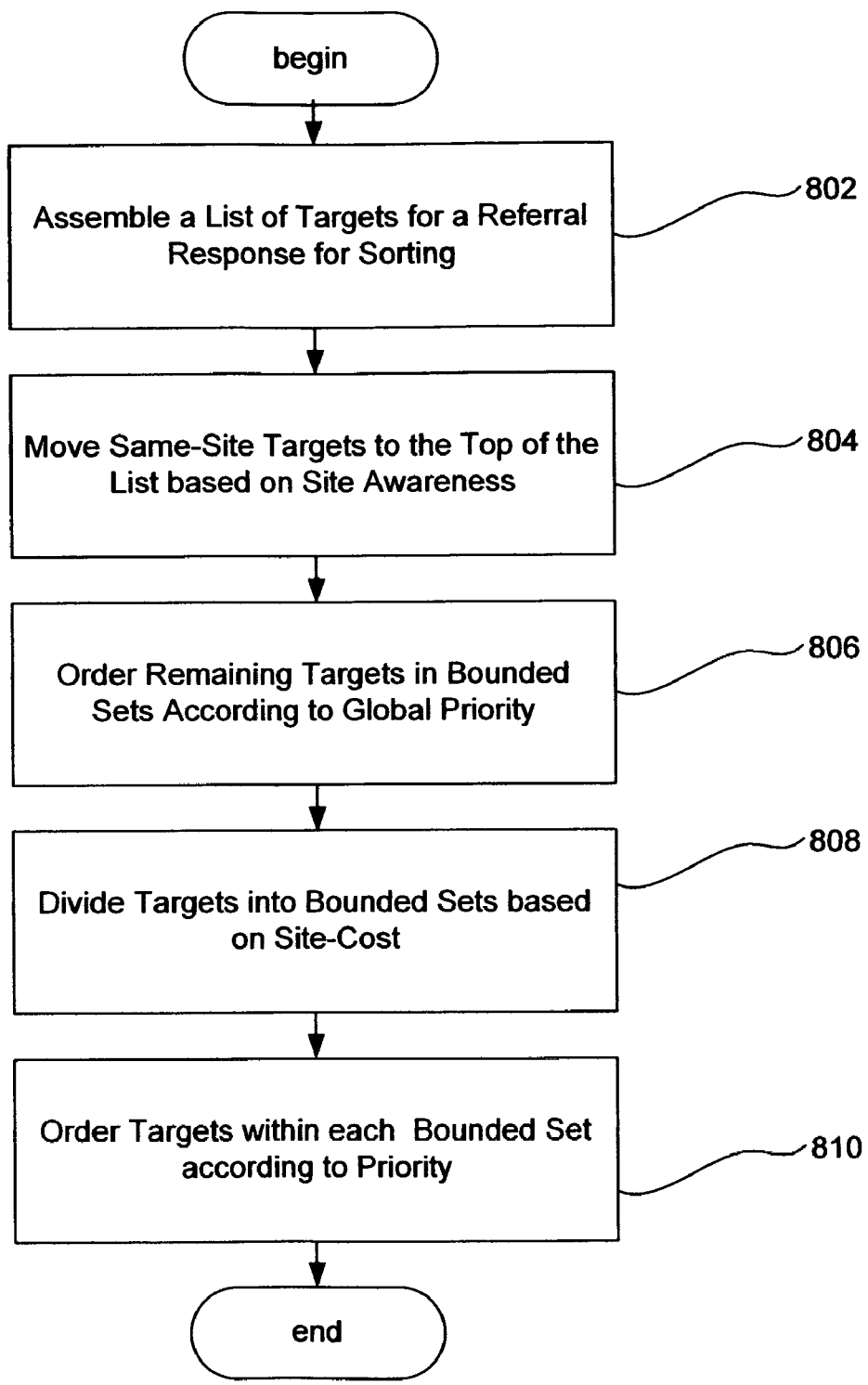
FIG. 8 is a flowchart generally representing the steps undertaken in one embodiment for sorting a referral response, in accordance with an aspect of the invention.

FIG. 8 presents a flowchart generally representing the steps undertaken in one embodiment for sorting a referral response, in accordance with an aspect of the invention. When a referral request may be sorted, various combinations of the above-described methods may be implemented. In the embodiment shown in the flowchart of FIG. 8, site-awareness, site-cost, and target priority may each be used in sorting targets in a referral response.

At step 802, a list of targets that may fulfill a client computer request may be assembled for a referral response for sorting. Then, at step 804, targets within the same site as the requesting computer may be sorted to the top of the list as has been previously described as site awareness. At step 806, remaining targets may be sorted according to global priority. More specifically, targets associated with a global high priority may be sorted toward the top of the target list while targets associated with a global low priority may be sorted toward the bottom of the target list.

Next, targets that may not be designated as either global high or global low may be sorted according to an associated site-cost. In one embodiment, such targets that may not be designated as either global high or global low may be designated as global normal. Thus, these targets may be grouped into bounded sets of targets such that each targets in any given bounded set may be associated with a site-cost similar or equivalent to all other targets in that particular bounded set. Furthermore, each first target in each bounded set may include in one embodiment a set boundary bit that may indicate the beginning of a bounded set.

Each bounded set may be further sorted at step 810 based on priority associated with each target in the bounded sets. Thus, targets within a bounded set associated with a high priority may be sorted to the top of the bounded set and targets within a bounded set associated with a low priority may be sorted to the bottom of the bounded set. In this manner, each bounded set may be sorted by priority and may be nested within a site-cost sorting, which in turn may be nested within a global priority sorting.

Again, those skilled in the art will appreciate that an implementation may choose to perform theses steps in a different order or may choose only to perform some of these steps for purposes of efficiently or flexibility, while achieving the same effect and without departing from the scope of the present invention.

In this way, the system and method may support both target priority and target fail-back. A client computer system may attempt fail-back to another target of lower site-cost and/or higher priority. The present invention may advantageously support sorting referrals based on site-awareness and/or target-priority. Sorting referrals based on site-awareness may provide a set of targets in the same site as the Dfs server providing referrals to the client computer system and another set having all other targets. Sorting referrals based on target-priority may provide bounded-sets in order of priority where each bounded set may include targets having the same target-priority as determined by the client computer system requesting the referral. In one embodiment, a referral response may be sorted into bounded sets having the same site-cost and server target priority.

As can be seen from the foregoing detailed description, the present invention provides an improved system and method for determining target fail-back and target priority for a distributed file system. In response to a request from a client computer, a list of targets may be provided to a client computer that may be sorted based on an assessment of a site-cost associated with each respective target. Lower-cost targets may be sorted to the top of the referral response, so that a client computer may simply parse logically through the referral response starting with the lower-cost targets to attempt to establish connectivity before making an attempt to establish connectivity with higher-cost targets.

Additionally, sorting targets may also be implemented using a priority ranking of targets whereby, in one embodiment, higher priority targets may also be sorted to the top of the referral response. Furthermore, the referral response may be further sorted to include provisions for both site-cost and target-priority. Thus, groups of targets having an equivalent associated site-cost may be further sorted within the group according to an each target's respective associated target-priority. Any computer system may further use a sorted referral response of the present invention to fail back to a higher priority target by selecting and designating a new set target from a list of targets sorted according to site-cost and/or target-priority. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method for locating a file in a network of computers, the method comprising:
   requesting, by a client computer, a location of a file located on at least one server computer in a network of server computers;
   receiving, by the client computer, a list of a plurality of targets, each of the plurality of targets corresponding to a location in the network of server computers storing the file, wherein the plurality of targets are sorted into bounded sets based on a site-cost of each target such that each bounded set is associated with a same site-cost, wherein the site-cost is associated with at least one parameter of a network that is used in retrieving the file between one of the plurality of targets and the client computer, the plurality of targets within each bounded set being further sorted based on a priority assigned to each target;
   selecting, by the client computer, a first target on the list of the plurality of targets for accessing the file, wherein the first target has the lowest site-cost of any available target on the list of the plurality of targets;
   for a subsequent access to the file, the client computer determining if a lower site-cost target from the list of the plurality of targets is available that has a lower site-cost than the first target; and
   in response to a lower site-cost target being available, the client computer accessing the file using the lower site-cost target.

2. The method of claim 1 wherein the list of targets comprises boundary attributes, including a site-cost between a target and the client computer.

3. The method of claim 1 wherein boundaries of each bounded set are based at least partially on the location of the server computer associated with each target.

4. The method of claim 1 wherein boundaries of each bounded set are based at least partially on a health indication associated with the server computer associated with each target.

5. The method of claim 1, wherein the determining if a lower site-cost target is performed whenever a target fail-back policy pertaining to the lower site-cost target is applied.

6. The method of claim 5, wherein the target fail-back policy is associated with the list of targets.

7. The method of claim 5, wherein the target fail-back policy is associated with a root that may be associated with each individual target in the list of targets.

8. The method of claim 1, further comprising removing at least one target from the list of targets based on an exclusion policy.

9. The method of claim 1, wherein the list of targets is ordered such that targets having a target-priority setting of global high are ordered at the top of a respective bounded set and targets having a target-priority setting of global low are ordered at the bottom of the respective bounded set.

10. A distributed computing system, comprising:
   a server computer operably coupled to a network, the server computer operable to:
      create a list of a plurality of targets;
      sort the list of targets according to a site-cost of each of the plurality of targets, the site-cost associated with at least one parameter of a network that is used in retrieving the file from a server computer corresponding to one of the plurality of targets to the client computer requesting the file;
      further sort the list of targets according to a priority assigned to each server computer corresponding to one of the plurality of targets; and
      provide the list to a client computer in response to a request for a file;
   the client computer coupled to the network, the client computer operable to:
      request and retrieve files from other computers coupled to the network,
      select a first target on the list of the plurality of targets for accessing the file, wherein the first target has the lowest site-cost of any available target on the list of the plurality of targets,
      for a subsequent access to the file, determine if a lower site-cost target from the list of the plurality of targets is available that has a lower site-cost than the first target, and
      in response to a lower site-cost target being available, access the file using the lower site-cost target, and
   at least one additional server computer storing a requested file thereon that corresponds to at least one of the targets.

11. The distributed computer system of claim 10 wherein the server computer is further operable to sort the list of targets into bounded sets such that each target in a respective bounded set is associated with the same site-cost as other targets in the respective bounded set and such that the bounded sets are sorted according to the site cost associated with each target in the bounded set.

12. The distributed computer system of claim 11 wherein the server computer is further operable to sort each target within each bounded set according to the priority assigned to each server computer.

13. The distributed computer system of claim 12 wherein the client computer is further operable to determine if the lower site-costs target is associated with a more preferred priority when compared to other targets in the list of targets, and access the file using a target having a more preferred priority.

14. In a computer system, a method for locating a file in a network of computers, the method comprising:
- receiving a request, from a client computer, for a location of a requested file that is located on at least one server computer in a network of server computers;
- determining a plurality of locations in the network of server computers in which the requested file is located;
- generating a list of a plurality of targets, each of the plurality of targets corresponding to a location in the network of server computers storing the requested file;
- sorting the list of the plurality of targets into bounded sets based on a site-cost of each target such that each bounded set is associated with a same site-cost, wherein the site-cost is associated with at least one parameter of a network that is used in retrieving the file between one of the plurality of targets and the client computer;
- further sorting the list of the plurality of targets according to a priority assigned to each server computer corresponding to one of the plurality of targets; and
- specifying a target fail-back policy in the list of the plurality of targets, the target fail-back policy indicating whether a lower site-cost target listed on the list of the plurality of targets can be used to access the file after a higher site-cost has been used to access the file; and
- providing an indication of the list of the plurality of targets and the target fail-back policy to the client computer.

15. The method of claim 14, wherein the further sorting the list of the plurality of targets according to a priority comprises sorting the list of the plurality of targets such that each target within each bounded set is ordered according to a priority assigned to each server computer corresponding to one of the plurality of targets.

16. The method of claim 15, wherein the further sorting the list of the plurality of targets according to a priority comprises ordering targets having a target-priority setting of global high at the top of a respective bounded set and ordering targets having a target-priority setting of global low at the bottom of the respective bounded set.

* * * * *